UNITED STATES PATENT OFFICE.

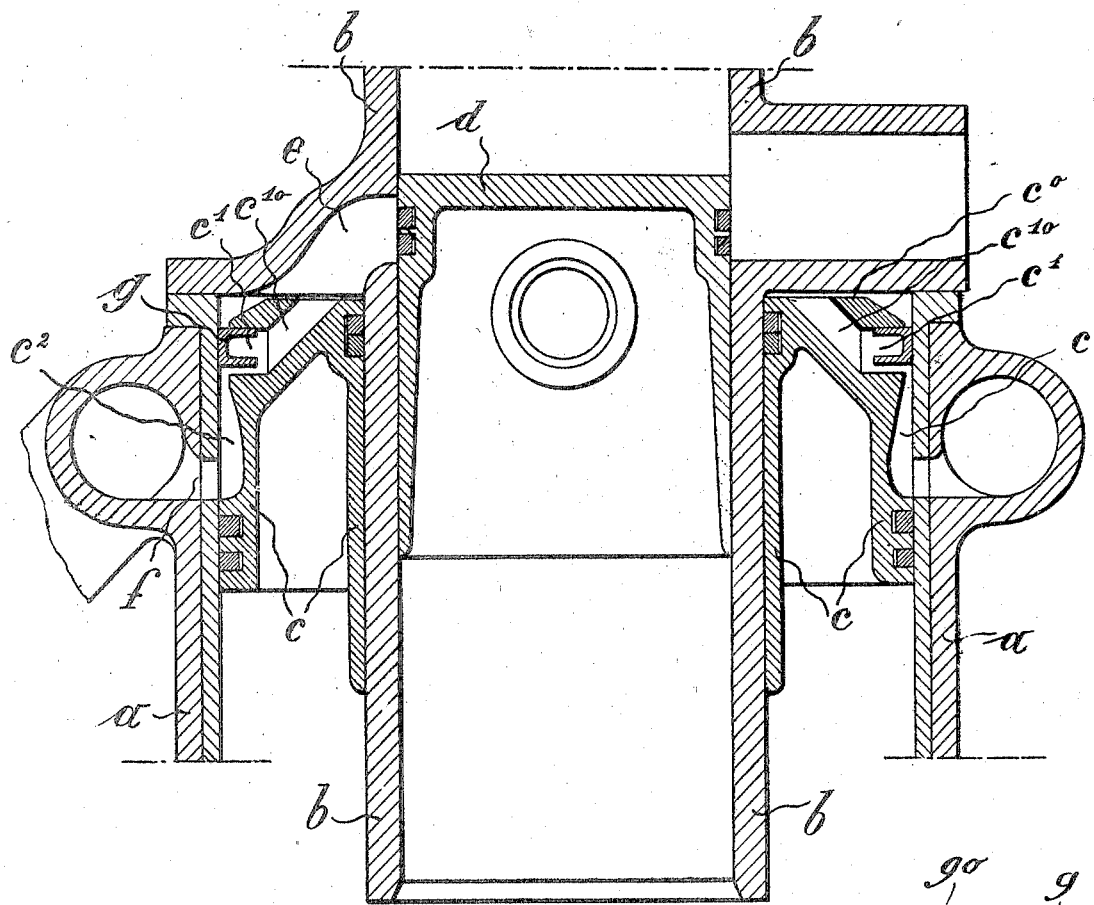

GUSTAVE EMILE CHÉDRU, OF PARIS, FRANCE.

PISTON.

1,307,895.   Specification of Letters Patent.   Patented June 24, 1919.

Application filed August 24, 1917. Serial No. 188,045.

*To all whom it may concern:*

Be it known that I, GUSTAVE EMILE CHÉDRU, citizen of the French Republic, residing at Paris, France, have invented certain new and useful Improvements in Pistons, of which the following is a specification.

This invention relates to pistons for motors in which the piston is provided with a valve, particularly to those pistons for charging pumps for two-stroke explosion engines.

The invention comprises a piston made in two parts, one of which forms the piston proper and comprises around its periphery an annular groove connected by suitable conduits to its operative face, and the other one of which forms a valve and is constituted by a ring mounted in the said annular groove and is of less height than the latter.

In combination with this main arrangement, the invention comprises other features pointed out in the claims.

The invention will be clearly understood from the following description and accompanying drawing, given by way of example.

Figure 1 shows partial axial vertical section of a two-stroke explosion engine with charging pump.

Fig. 2 shows in plan the valve of the said pump, and,

Fig. 3 shows the said valve in partial longitudinal section on the line 3—3 of Fig. 2.

The invention is shown as applied to a two-stroke explosion engine with a charging pump, of the kind forming the subject of the U. S. Patent No. 1,219,983 of March 20, 1917, that is to say, an engine in which the charging pump is constituted by an annular body $a$ surrounding the cylinder $b$ of the engine along a portion of its length, a piston $c$ independent of the piston $d$ of the engine, a port $e$ establishing communication between the interior of the pump and the interior of the engine cylinder, the said port being provided as near as possible to the cover of the pump body, and a port $f$ establishing communication between the source of fresh gas and the interior of the pump, the said port being uncovered by the pump piston after it has traveled a part of its suction stroke.

According to the present invention the drawback that the combustion gases filter into the pump body through the piston when the latter, in traveling its suction stroke, has not yet uncovered the port establishing communication between the interior of the pump and the source of fresh gas, is remedied, as follows: An annular piston $c$ is constructed, in the wall of which is provided, near to its operative face $c^0$, an annular groove $c^1$ of rectangular cross-section, which is connected by one or more conduits $c^{10}$ provided in the body of the piston, to the operative face of the latter.

The annular groove $c^1$ is preferably continued downward by a second annular groove $c^2$ of a smaller depth in the portion where it adjoins the annular groove $c^1$. There is also provided a ring $g$ of an outside diameter equal to the inside diameter of the cylinder $a$ in which the piston $c$ is to be mounted, and of less height than the groove $c^1$. The piston $c$ thus formed, is introduced into the cylinder $a$ of the pump, after having been provided with the necessary rings.

Thus a piston $c$ is obtained, provided with an annular automatically movable valve $g$ which, during the suction stroke of the piston, will be brought by its momentum, as well as by the depression produced by the suction and by its friction against the wall of the cylinder, to bear against the upper edge of the groove $c^1$, so that it will connect the groove $c^2$ to the conduits $c^{10}$. It follows therefrom that admission will be able to take place as soon as the groove $c^2$ arrives opposite the admission port, that is to say, long before the piston has uncovered the said port. On the contrary, during the compression stroke, the valve $g$, owing to its momentum, as well as to the pressure of the gases and to its friction against the wall of the cylinder, is forced against the lower edge of the groove $c^1$, so that, as soon as its upper edge has passed beyond the lower edge of the port $f$, any communication between the latter and the interior of the pump, is cut off.

The valve $g$ is preferably so arranged that it cannot become bent owing to the movement of one of its ends relatively to the other. For this reason, the said valve is made of U-shape in longitudinal section, the parallel branches of the U having the slightly smaller length than the width of the annular groove $c^1$. At the point where the two ends of the said valve join each other, is inserted, between the parallel branches of the U, a lining $h$ of a height equal to the distance between the said branches, and preferably moreover the said lining is prevented from falling out by means of a pin $g^0$. The free branches of the U are preferably given a certain elasticity in order to resist to a material extent wearing out of the parts against which it rests.

The invention is not limited to the construction described, but comprises any modifications within the scope of the claims.

Having now particularly described and ascertained the nature of my said invention and in what manner the same is to be performed, I declare that what I claim is:—

1. An internal combustion engine of the type described comprising a working cylinder having a piston to reciprocate therein and also having an annular chamber surrounding a portion thereof and forming with the latter an annular pump cylinder provided with an ingress port, a communicating port also being formed between the upper portion of said chamber and the cylinder, a piston mounted to reciprocate in said annular chamber and having a main annular groove in the upper portion thereof continued downwardly into a second annular groove of smaller depth than the main annular groove, and an automatically operating annular valve engaging the said main annular groove and having contact with the wall of the annular chamber to control the port in the latter and communication thereof with the port between the annular chamber and the cylinder, the piston in the annular chamber also having one or more conduits opening into the main annular groove.

2. In an internal combustion engine of the type described comprising a working cylinder having a piston to reciprocate therein and also provided with an annular chamber surrounding a portion thereof and forming with the latter an annular pump cylinder, a port being formed in the wall of the working cylinder to provide communication between the latter and the annular chamber and the wall of the annular chamber also having a port therein in communication with a source of gas, a piston mounted to reciprocate in the annular chamber and having a plurality of ports extending through the upper portion thereof to set up communication between the ports of the cylinder and the gas charging port, the piston being provided with an upper main groove into which open the upper plurality of ports and a continuing lower shallower groove, and an automatically shiftable valve in the upper main port having a self-contracting and expanding actuation, the said valve controlling communication between the gas charging port of the pump and the plurality of ports through the upper port of the piston in the said annular chamber.

3. An internal combustion engine of the type described comprising a working cylinder having a piston to reciprocate therein and also provided with an annular chamber surrounding a portion thereof and forming with the latter an annular pump cylinder provided with a gas charging port, the working cylinder also having a port opening therefrom and adapted to communicate with the upper port of the annular chamber, and a piston mounted to reciprocate in the annular chamber and having a plurality of ports through the upper portion thereof to provide communicating means between the gas charging port and the port of the working cylinder, the piston in the annular chamber also being provided with automatically operating means for cutting off communication between the said ports.

In testimony whereof I have hereunto set my hand in presence of two subscribing witnesses.

GUSTAVE EMILE CHÉDRU. [L. S.]

Witnesses:
JOSEPH GEMENIE,
EUGÈNE JULTIE.